United States Patent Office 3,297,739
Patented Jan. 10, 1967

3,297,739
HEXACYANOBENZENE
Kurt Wallenfels and Klaus Friedrich, Freiburg im Breisgau, Germany, assignors to Farbwerke Hoechst Aktiengesellschaft vormals Meister Lucius & Bruning, Frankfurt am Main, Germany, a corporation of Germany
No Drawing. Filed Dec. 17, 1963, Ser. No. 331,114
Claims priority, application Germany, June 21, 1963,
F 40,030
1 Claim. (Cl. 260—465)

The present invention provides the hitherto unknown hexacyanobenzene; furthermore, the present invention provides a process for preparing hexacyanobenzene, wherein tricyanomesitylene is converted into pentacyanotoluene by consecutive reaction with alkyl nitrite and a dehydrating agent, and pentacyanotoluene is then further treated consecutively with alkyl nitrite and a dehydrating agent.

The tricyanomesitylene used as the starting product can be prepared in known manner and in good yield, for example, by treating tribromomesitylene with copper-I-cyanide.

The process of the present invention is carried out by reacting tricyanomesitylene with an alkyl nitrite, whereby tricyanomesitylene is converted into the dioxime of 2,4,6-triacyano-5-methyl-isophthalaldehyde. As alkyl nitrites are suitable for this reaction especially nitrous acid esters of low molecular aliphatic alcohols such as ethyl nitrite, propyl nitrite, butyl nitrite, amyl nitrite or isoamyl nitrite. The alkyl nitrite is advantageously used in an excess of about 30 and more percent, while carrying out the reaction in the presence of a strong base and a solvent. It is particularly suitable to use a solution of an alkali metal alcoholate or alkaline earth metal alcoholate in an alcohol such as ethanol, methanol, propanol, butanol, tert. butanol or amyl alcohol. It is advantageous to use sodium ethylate in ethanol, potassium tert. butylate in tertiary butanol, calcium ethylate in ethanol or sodium methylate in methanol may also be used with success. As the reaction temperatures, moderately reduced temperatures, for example temperatures in the range from −20° C. to room temperature, preferably a temperature of 0° C., are used. Under these conditions, the dioxime is obtained in the form of its alkali metal salt or alkaline earth metal salt. As a by-product, the corresponding salt of 2,4,6 - tricyano - 3,5 - dimethyl-benzaldehydeoxime is formed in a small quantity.

The mixture thus obtained can directly be converted into pentacyanotoluene with the aid of dehydrating agents such as thionyl chlorine or phosgene, without previous isolation. Thionyl chloride is particularly suitable for the dehydration. As the direct reaction with the salt mixture proceeds very violently, it is of advantage to work in an inert suspending or diluting agent, for example, an ether such as diethyl ethyl or an aromatic hydrocarbon such as benzene. The reaction can be carried out at a slightly elevated or slightly reduced temperature, preferably at a temperature in the range from 10 to 30° C.

The crude product can be purified, for example, by boiling in an aromatic hydrocarbon, for example, benzene or toluene, or in an ether, for example, dioxane or tetrahydrofurane, and following chromatography on acid (anionotropic) aluminium oxide. If the residue still contains free oxime after boiling, it may be boiled once again with thionyl chloride prior to chromatographing for renewed dehydration, preferably without addition of a diluting agent. By eluting with benzene, first the unreacted starting material, then the tetracyano-m-xylene, which is formed as a by-product to a small amount, and finally the pentacyanotoluene is washed out of the column.

Pentacyanotoluene crystallizes in the form of long colorless needles decomposing at 255° C. Owing to its considerable C–H acidity, the compound forms deep blue salts with organic bases such as piperidine, pyridine or morpholine.

For being converted into hexacyanobenzene, pentacyanotoluene is again reacted with alkyl nitrite. Suitable alkyl nitrites are also in this case the easily volatile nitrous acid esters of low molecular aliphatic alcohols, for example, ethyl nitrite, propyl nitrite or isoamyl nitrite. This reaction, however, succeeds in alcohol and in the presence of an alkali metal alcoholate or alkaline earth metal alcoholate difficultly only, but succeeds easily in a low molecular fatty acid amide, for example, in pure dimethylformamide or dimethylacetamide as the solvent, at a weakly elevated or weakly reduced temperature, preferably at a temperature in the range from 10 to 30° C. Completion of the reaction can be determined by a spot test with piperidine, i.e. when no blue coloration occurs, which is generally the case after a reaction period of several hours.

This base-free reaction must insofar be considered surprising as it is known that methyl groups can be converted into isonitroso groups by the action of nitrous acid esters in the presence of an alkali metal alcoholate (cf. Houben-Weyl, year 1954, volume VII, Part 1, page 151), while the reaction of a methyl group with a nitrous acid ester in the absence of a base directly leads to an aldehyde group (cf. Liebigs Annalen der Chemie, 311 (1900), page 363). Thus, it would have to be expected that even by the process of the present invention there would be formed from pentacyanotoluene the corresponding pentacyanobenzaldehyde.

For the subsequent dehydration it is not necessary to isolate the oxime. The solution is rather concentrated, advantageously under reduced pressure, at room temperature or at a slightly elevated or at a slightly reduced temperature, to about half of its original volume, and then a dehydrating agent, for example, thionyl chloride, is added. The reaction is completed at room temperature, in particular at temperatures of between 15 to 35° C., in the course of a few hours. When working at slightly elevated or slightly reduced temperatures, the reaction periods are shortened or lengthened correspondingly. In order to isolate the hexacyanobenzene, the reaction mixture is poured onto ice, and the product that has separated is filtered off with suction. The hexacyanobenzene can also be separated by concentration of the solution and addition of a CT-complex donator, for example, pyrene or N,N,N′,N′-tetramethyl-p-phenylenediamine. The splitting of the molecule complexes when using pyrene is carried out by fractionated sublimation and when using N,N,N′,N′-tetramethyl-p-phenylenediamine by reaction with dilute hydrochloric acid. After drying, it can be recrystallized from, for example, an aromatic hydrocarbon, for example, benzene or toluene, a low molecular fatty acid nitrile or amide, for example, acetonitrile or dimethylformamide or an ether, for example, dioxane. Hexacyanobenzene forms small colorless platelets having a strong surface lustre and which, when heated, slowly discolor at 310° C. and turn black without melting up to 370° C. The substance begins to sublimate at a pressure of $10^{-3}$ mm. Hg and 200° C. The analytical data (Found: C, 63.19; N, 36.82. Calculated: C, 63.17; N, 36.83) are corroborated by the infrared spectrum in which the CH bands are completely missing. Besides the CN band with low intensity at 2260 cm.$^{-1}$, this spectrum exhibits only 3 absorption peaks at 1430, 844 and 745 cm.$^{-1}$, as might be expected for similarly and completely substituted benzene derivatives. With aromatic hydrocarbons hexacyanobenzene forms deeply colored complexes. For example, the addition product of 1 mol of hexacyanobenzene and 2 mols of pyrene crystallizes in black crystals.

The product of the present invention is very well suitable for preparative separation of hydrocarbons having a low ionization potential from dilute solutions, and for a qualitative proof of aromatic compounds. For example, the latter can be made visible on chromatograms with high sensitivity and characteristic colorations by spraying with hexacyanobenzene, anthracene forming blue spots, pyrene green spots, hydroquinone violet, pyrocatechol red and resorcinol orange spots.

Furthermore, hexacyanobenzene has very good semiconductor properties. Its superiority over other known semi-conducting organic compounds results from the following table which shows the dependence on temperature of the specific electric resistance of the complex of hexacyanobenzene and N,N,N',N'-tetramethyl-p-phenyldiamine compared with the corresponding values of isoviolanthrole, violanthrole and anthacene. As is shown in the table the electric resistance of the complex is always smaller by some powers of ten than that of the substances used for comparison.

| Specific resistance [Ohm·cm.] of the hexacyanobenzene complex | Temperature [° C.] | Specific resistance [Ohm·cm.] of the substances used for comparison |
|---|---|---|
| $1 \cdot 10^{11}$ | 14 | |
| $5 \cdot 10^6$ | 110 | Isoviolanthrole, $1.31 \cdot 10^8$ |
| $1.4 \cdot 10^6$ | 120 | Violanthrole, $4 \cdot 10^8$ |
| $1 \cdot 10^5$ | 160 | Anthracene, $2 \cdot 10^{10}$ |
| $4 \cdot 10^3$ | 210 | |

The following example illustrates the invention but it is not intended to limit it thereto:

*Example.—Hexacyanobenzene*

(a) 6 g. of tricyanomesitylene were suspended in 80 cc. of absolute ethanol, cooled to 0° C., and then 9 cc. of ethyl nitrite and an ice-cooled solution of 3.5 g. of sodium in 100 cc. of ethanol were added, while stirring. After having continued stirring for 50 minutes at 0° C., the precipitated sodium salt was filtered off and washed with absolute ether until it was free from ethanol. The salt was then dried for 6–8 hours at a pressure of $10^{-2}$ mm. Hg and 20° C., while cooling the large cooling trap with liquid nitrogen. For the reaction with thionyl chloride, the salt was suspended in absolute ether and then gradually introduced, with stirring, into a solution of 10 cc. of thionyl chloride in 200 cc. of ether, on an ice bath. Stirring was continued for 18–20 hours at room temperature, the whole was filtered and washed with a small quantity of ether, and the resulting light brown product, which still contained tricyanomesitylene, sodium chloride, thionyl chloride and the free oximes, was then placed in a vacuum dessicator. The mixture was allowed to stand overnight over potassium hydroxide and was then washed with absolute benzene until no pentacyanotoluene could be proved by pyrene in the benzene. The benzene extract was then chromatographed on a column of acid aluminium oxide having an activity degree of II according to Woelm. The first fraction contained unchanged tricyanomesitylene, the second fraction contained tetracyano-m-xylene (0.8 g. of white needles having a melting point of 199–200° C.) followed by pentacyanotoluene. The 2,3,4,5,6-pentacyanotoluene was subsequently recrystallized from benzene. The yield was 1.9 g. The compound which was obtained in the form of white needles was found to melt at 255–260° C.

$C_{12}H_3N_5$, 217.19. Calculated: C, 66.36; H, 1.39; N, 32.25. Found: C, 66.45; H, 1.67; N, 32.02.

The tricyanomesitylene used as the starting substance was prepared in the following manner:

1 mol of tribromomesitylene together with 3.2 mol of copper-(I)-cyanide in 500 cc. of dimethylformamide were refluxed, while stirring, for 3 hours, and the black-brown solution was introduced, while still hot, into a 30° C. hot hydrochloric solution of iron-(III)-chloride in water. Separation of the tricyanomesitylene was completed after 30 minutes by cooling with ice. The well dried product could be sublimated at 160° C. and 12 mm. Hg and was then recrystallized from benzene. The yield amounted to 76% of the theoretical yield. Melting point 179–181° C.

(b) 2 g. of pentacyano-toluene, purified by chromatography on aluminium oxide, were dissolved in 50 cc. of high purity absolute dimethylformamide and 3 cc. of ethyl nitrite were added to this solution at room temperature. The closed flask was allowed to stand for about 12 hours until a sample of the solution did not show a blue or green coloration upon addition of 1 droplet of morpholine. When the complete consumption of pentacyanotoluene was thus proved, excess ethyl nitrite and the alcohol formed were eliminated by means of a rotational evaporator at a maximum temperature of 30° C. and in a water-jet vacuum, and 5 cc. of pure thionyl chloride distilled over red phosphorus and quinoline were added to the yellow-brown solution which had remained behind. The mixture heated up to about 30° C. After having been allowed to stand for 2 hours, the mixture was poured onto ice and the precipitated crude product was filtered off. After having been washed with ice water, the product was dried under reduced pressure over calcium chloride. A light yellow powder was obtained in a yield of 1.1 g.=50% of the theoretical yield. The compound was purified by recrystallization from boiling absolute acetonitrile, and hexacyanobenzene was obtained in the form of small colorless, cubical or rhombic crystals. The compound was found to begin to discolor at about 310° C. and to turn black without melting at about 370° C.

*Analysis.*—$C_{12}N_6$, 228.18. Calculated: C, 63.17; H, 0.00; N, 36.83. Found: C, 63.19; H, 0.01; N, 36.82.

We claim:

Hexacyanobenzene.

No references cited.

CHARLES B. PARKER, *Primary Examiner.*

D. R. MAHANAND, D. TORRENCE,
*Assistant Examiners.*